(12) United States Patent
Frenger et al.

(10) Patent No.: US 10,863,365 B2
(45) Date of Patent: Dec. 8, 2020

(54) RADIO NETWORK NODE, AND METHOD PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventors: Pål Frenger, Linköping (SE); Fredrik Gunnarsson, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/468,598

(22) PCT Filed: Dec. 22, 2017

(86) PCT No.: PCT/SE2017/051346
§ 371 (c)(1),
(2) Date: Jun. 11, 2019

(87) PCT Pub. No.: WO2018/128576
PCT Pub. Date: Jul. 12, 2018

(65) Prior Publication Data
US 2019/0357059 A1 Nov. 21, 2019

Related U.S. Application Data

(60) Provisional application No. 62/441,582, filed on Jan. 3, 2017.

(51) Int. Cl.
*H04W 4/00* (2018.01)
*H04W 16/28* (2009.01)
(Continued)

(52) U.S. Cl.
CPC .......... *H04W 16/28* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS

2014/0064247 A1* 3/2014 Teyeb ............... H04W 36/02
370/331
2016/0190707 A1* 6/2016 Park .................. H01Q 3/24
370/334

(Continued)

OTHER PUBLICATIONS

Author Unknown, "Technical Specification Group Services and System Aspects; Study on Architecture for Next Generation System (Release 14)," Technical Report 23.799, Version 0.5.0, 3GPP Organizational Partners, May 2016, 178 pages.

(Continued)

*Primary Examiner* — Clemence S Han
(74) *Attorney, Agent, or Firm* — Withrow & Terranova, PLLC

(57) ABSTRACT

Embodiments herein relate to a first radio network node for handling communication of a wireless device in a wireless communication network, wherein the first radio network node provides radio coverage over a first service area using a first reference signal, which first reference signal is for identifying the first service area in the wireless communication network. The first radio network node changes one or more antenna parameters, corresponding to one or more antenna ports used for an active mode transmission for the wireless device, independently of one or more other antenna parameters corresponding to one or more other antenna ports used for an idle mode transmission within the first service area. The first radio network node further uses the one or (Continued)

more antenna ports for active mode transmissions for the wireless device and/or the one or more other antenna ports for idle mode transmissions within the first service area.

14 Claims, 12 Drawing Sheets

(51) Int. Cl.
    *H04B 7/06*     (2006.01)
    *H04W 36/00*     (2009.01)
    *H04W 36/06*     (2009.01)
    *H04L 5/00*     (2006.01)

(52) U.S. Cl.
    CPC ....... *H04W 36/0094* (2013.01); *H04W 36/06* (2013.01); *H04L 5/0048* (2013.01)

(56) References Cited

U.S. PATENT DOCUMENTS

| | | | |
|---|---|---|---|
| 2016/0302114 A1* | 10/2016 | Jain | H04W 24/10 |
| 2018/0035421 A1* | 2/2018 | Lin | H04W 74/0833 |
| 2018/0124636 A1* | 5/2018 | Ly | H04L 5/0048 |
| 2019/0274076 A1* | 9/2019 | Kim | H04W 36/0058 |

OTHER PUBLICATIONS

Author Unknown, "Technical Specification Group Radio Access Network; Study on Scenarios and Requirements or Next Generation Access Technologies; (Release 14)," Technical Report 38.913, Version 0.3.0, 3GPP Organizational Partners, Mar. 2016, 30 pages.
Ericsson, "R1-1611914: NR Synchronization signals for idle and connected mode mobility," Third Generation Partnership Project (3GPP), TSG-RAN WG1 Meeting #87, Nov. 14-18, 2016, 6 pages, Reno, NV, USA.
Ericsson, "R2-162762: Active Mode Mobility in NR: SINR drops in higher frequencies," Third Generation Partnership Project (3GPP), TSG-RAN WG2 #93bis, Apr. 11-15, 2016, 4 pages, Dubrovnik, Croatia.
Ericsson, "R2-166927: Inter-node ping-pong avoidance in state transitions," Third Generation Partnership Project (3GPP), TSG-RAN WG2 Meeting #95bis, Oct. 10-14, 2016, 4 pages, Kaohsiung, Taiwan.
NTT Docomo, "RP-160671: New SID Proposal: Study on New Radio Access Technology," Third Generation Partnership Project (3GPP), TSG RAN Meeting #71, Mar. 7-10, 2016, 8 pages, Göteborg, Sweden.
International Search Report and Written Opinion for International Patent Application No. PCT/SE2017/051346, dated Mar. 2, 2018, 12 pages.

* cited by examiner

RADIO NETWORK NODE, AND METHOD PERFORMED THEREIN FOR HANDLING COMMUNICATION IN A WIRELESS COMMUNICATION NETWORK

This application is a 35 U.S.C. § 371 national phase filing of International Application No. PCT/SE2017/051346, filed Dec. 22, 2017, which claims the benefit of U.S. Provisional Application No. 62/441,582, filed Jan. 3, 2017, the disclosures of which are incorporated herein by reference in their entireties.

TECHNICAL FIELD

Embodiments herein relate to a first radio network node and a method performed therein regarding wireless communication. Furthermore, a computer program product and a computer-readable storage medium are also provided herein. In particular, embodiments herein relate to handling communication of a wireless device in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas also known as cells or cell areas, with each service area being served by a radio network node such as an access node e.g. a Wi-Fi access point or a radio base station (RBS), which in some networks may also be called, for example, a "NodeB" or "eNodeB". The service area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum called Third Generation Partnership Project (3GPP), telecommunications suppliers propose and agree upon standards for present and future generation networks, and investigate e.g. enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) are being completed within the 3$^{rd}$ Generation Partnership Project (3GPP) and continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

A load balancing and/or load sharing of active mode wireless devices of intra carriers/frequencies in LTE is carried out in order to distribute active mode data traffic amongst different active mode cells in a better manner. The term load sharing and load balancing will be used in an inter changeable manner in this text. Major methods used for this purpose in LTE include;

1) Cell range expansion (CRE) based load sharing
2) Antenna parameter modification based load sharing CRE is used to extend an active mode coverage of a cell in LTE. This is carried out with the help of additional offsets such as Cell Individual Offsets (CIO), that will be relevantly configured by a serving radio network node, i.e. the radio network node that is expanding its active mode coverage into a neighboring cell, sent to the wireless device. This additional offset is used by the wireless device to generate relevant measurement report towards the serving radio network node in order to indicate the presence of a neighboring cell. Basically, a CRE will delay a handover (HO) of a wireless device into the neighboring cell in the active mode. CRE will not affect the idle mode coverage of the cell as the additional offset is applicable only for the active mode wireless devices. The impact of applying the CRE based load sharing mechanisms is shown in FIG. 1. FIG. 1 shows Idle mode and active mode coverage of a cell when CRE based load sharing mechanisms are used in LTE. This is an example configuration wherein the source node has expanded by equal amount in all direction i.e. same CIO is applied to all neighbors.

Antenna parameter modification based load sharing wherein an antenna parameter based capacity and coverage optimization is used and is known to provide very large gains. Such optimizations are especially useful when there is a dynamic need to provide capacity boost in a small region where traffic demanding wireless devices are localized. With the antenna parameter modification based load sharing mechanisms, one of the radio network nodes with less traffic may expand its coverage area, both in idle and active mode, by changing its relevant antenna parameters. The impact of antenna parameter changes on coverage area of a cell is shown in FIG. 2. FIG. 2 shows Impact of antenna parameter changes on cell coverage (both idle and active mode) in LTE.

With the emerging fifth generation (5G) technologies, the use of very many transmit- and receive-antenna elements is of great interest since this enables utilization of beamforming, such as transmit- and receive-side beamforming. Transmit-side beamforming means that a transmitter can amplify transmitted signals in a selected direction or directions, while suppressing transmitted signals in other directions. Similarly, on the receive-side, a receiver can amplify signals from a selected direction or directions, while suppressing unwanted signals from other directions.

Beamforming allows the signal to be stronger for an individual connection. On the transmit side this may be achieved by a concentration of the transmitted power in the desired direction(s), and on the receive side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Overall requirements for the Next Generation (NG) architecture e.g. TR 23.799 v.0.5.0, and, more specifically the NG Access Technology, e.g. TR 38.913 v.0.3.0 may impact the design of the Active Mode Mobility solutions for the New Radio Access Technology or New Radio (NR), see RP-160671 New SID Proposal: Study on New Radio Access Technology, DoCoMo, compared to the current mobility solution in LTE. Some of these requirements may be the need to support network energy efficiency mechanisms, future-proof-ness and the need to support a very wide range of frequencies e.g. up to 100 GHz.

One of the main differences, with respect to LTE, comes from the fact that propagation in frequencies above the ones allocated to LTE is more challenging so that a massive usage of beamforming becomes an essential component of NR. Despite link budget gains provided by beamforming solutions, reliability of a system purely relying on beamforming and operating in higher frequencies might be challenging, since the coverage might be more sensitive to both time and space variations. As a consequence of that a Signal to Interference plus Noise Ratio (SINR) of a narrow link may drop much quicker than in the case of LTE, see R2-162762, Active Mode Mobility in NR: SINR drops in higher frequencies, Ericsson.

To support Transmit (Tx) side beamforming at a radio network node, a number of reference signals (RS) may be transmitted from the radio network node, whereby the wireless device may measure signal strength or quality of these reference signals and report the measurement results to the radio network node. The radio network node may then use these measurements to decide which beam(s) to use for one or more wireless devices.

A combination of periodic and scheduled reference signals may be used for this purpose.

The periodic reference signals, typically called beam reference signals (BRS) or Mobility Reference Signals (MRS), are transmitted repeatedly, in time, in a large number of different directions using as many Tx-beams as deemed necessary to cover a service area of the radio network node. As the naming indicates, each BRS may represent a unique Tx-beam from that radio network node. This allows a wireless device to measure the BRS when transmitted in different beams, without any special arrangement for that wireless device from the radio network node perspective. The wireless device reports e.g. the received powers for different BRSs, or equivalently different Tx-beams, back to the radio network node.

The scheduled reference signals, called channel-state information reference signals (CSI-RS), may be transmitted only when needed for a particular connection. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a NR network may transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

Beamforming introduces possibility to enhance the signal towards a specific location. This enables better signal to noise ratio towards a specific wireless device.

A specific beamforming towards a specific wireless device is handled per Transmission Time Interval (TTI) where a number of factors and measurements are used to determine how the beamforming should look like. With an increasing number of antenna elements, the number of possible beams that theoretically can be created increases a lot.

The proposed solution for downlink based active mode mobility in NR is depicted in FIG. 3. A wireless device is served by the leftmost node but is traveling in the direction towards the rightmost node (depicted by the dashed arrow in the figure). The wireless device uses the best "home MRS" for coarse timing estimation and radio link quality monitoring and failure detection (denoted by the filled oval in the figure).

In addition, the wireless device monitors a sparse periodic MRS from the serving radio network node and compares it with similar periodic and sparse MRSs from potential target radio network nodes. When a target radio network node becomes relevant for a more detailed handover procedure additional dynamically configured home MRSs and dynamically configured away MRSs may be activated.

A final handover decision is taken by the network and it is based on wireless device reports containing measurement of home MRSs and away MRSs.

An example for system information acquisition for 5G NR is depicted in FIG. 4. In the example each radio network node transmits a synchronization signals (SS) or a system signature signal, e.g. $SS_1$ and $SS_2$. Together with the SS each radio network node also transmits a physical broadcast channel (PBCH) containing some of the minimum system information (SI) that the wireless device needs to access the network. This part of the minimum system information is denoted a master information block (MIB) in the FIG. 4. The transition of SS and the PBCH containing the MIB is denoted with dashed ovals in the FIG. 4.

By reading the MIB the wireless device receives information on how to receive the system information block (SIB) table. The SIB table may be transmitted using a broadcast format such as single frequency network (SFN) transmission and it is depicted with an oval covering both the dashed ovals.

In addition to the minimum system information that is periodically broadcasted in by the SS+MIB and in the SIB-table the wireless device may receive other system information e.g. by a dedicated transmission after initial access is established, depicted with a small dotted oval within one of the dashed ovals and denoted as additional SI transmission.

Adapting the load sharing mechanisms of LTE directly to a beamforming system like NR has some fundamental problems because of which their usage might be restricted. The impact of using CRE based load sharing method in an active mode beam based system is shown in FIG. 5.

Though the CRE based load sharing mechanisms are effective in aiding load reduction in one or more of the neighboring cells, it has some of the drawbacks. For example, wireless devices are at a higher risk of Radio Link Failure (RLF) when in the CRE region since the actual reception quality of beam reference signals, based on which the wireless device is carrying out its Radio Link Monitoring (RLM) procedure, from the source radio network node is degraded in the CRE region.

SUMMARY

Using adjustment of antenna parameters e.g. affecting antenna tilt in wireless communication networks using beamforming will work well from the point of view of load sharing effectively but it changes both the active mode and idle mode coverage of the signal as shown in FIG. 6. An operator plans meticulously for having the best idle mode (access related) coverage and any changes in these plans may be considered as a risk by the operator and hence the powerful adjustment of antenna parameters used as a load sharing mechanism might not be prioritized by the operators and thus performance of the wireless communication network may be limited or reduced.

An object of embodiments herein is to provide a mechanism that improves the performance of the wireless communication network.

According to an aspect the object is achieved by providing a method performed by a first radio network node for handling communication of a wireless device in a wireless communication network. The first radio network node provides radio coverage over a first service area using a first reference signal, also referred to as a first beam, for identifying the first service area in the wireless communication network. The first radio network node may determine to initiate an active mode for the wireless device due to e.g. a load sharing process between the first radio network node and a second radio network node. The first radio network node changes one or more antenna parameters, corresponding to one or more antenna ports used for an active mode transmission for the wireless device, independently of one or more other antenna parameters corresponding to one or more other antenna ports used for an idle mode transmission within the first service area. The first radio network node then uses the one or more antenna port for active mode transmissions for the wireless device and/or the one or more other antenna ports for idle mode transmissions within the first service area.

It is herein also provided a computer program product comprising instructions, which, when executed on at least one processor, causes the at least one processor to carry out the methods herein, as performed by the first radio network node. Furthermore, it is herein provided a computer-readable storage medium, having stored thereon a computer program comprising instructions which, when executed on at least one processor, cause the at least one processor to carry out the methods herein, as performed by the first radio network node.

According to another aspect the object is achieved by providing a first radio network node for handling communication of a wireless device in a wireless communication network. The first radio network node is configured to provide radio coverage over a first service area using a first reference signal, also referred to as a first beam, for identifying the first service area in the wireless communication network. The first radio network node may further be configured to initiate an active mode for the wireless device e.g. during a load sharing process between the first radio network node and a second radio network node. The first radio network node is configured to change, also referred to as adjust, one or more antenna parameters corresponding to one or more antenna ports used for an active mode transmission for the wireless device, independently of one or more other antenna parameters corresponding to one or more other antenna ports used for an idle mode transmission within the first service area. The first radio network node is further configured to use the one or more antenna port for active mode transmissions for the wireless device and/or the one or more other antenna ports for idle mode transmissions within the first service area.

Embodiments herein provide the flexible coverage changes for the active mode transmissions, which is an advantage of a parameter changing related load sharing feature, without changing coverage for the idle mode transmissions of the first radio network node, which is an advantage of the CRE based load sharing. For example, the antenna parameters corresponding to one or more antenna ports related to the active mode reference signals will be varied to change the coverage area of the active mode transmissions from the first radio network node while not altering the antenna parameters corresponding to one or more antenna ports related to the idle mode coverage. Thus, the antenna ports used for the transmission of reference signals to be monitored by active mode wireless devices are different from antenna ports used for the transmission of reference signals to be monitored by the idle mode wireless devices. In that the ports are different the antenna parameters of these ports may be changed independently.

Embodiments herein thereby enable dynamic active mode load sharing between the radio network nodes without affecting the carefully planned idle mode coverage of the cells. Basically, the embodiments herein take only the good features of load sharing mechanisms and leave out their drawbacks. Thus, embodiments herein may provide an active mode load sharing mechanism in e.g. NR without affecting the idle mode coverage of the radio network node. This will make the active mode load sharing mechanism more attractive to use and this leads to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
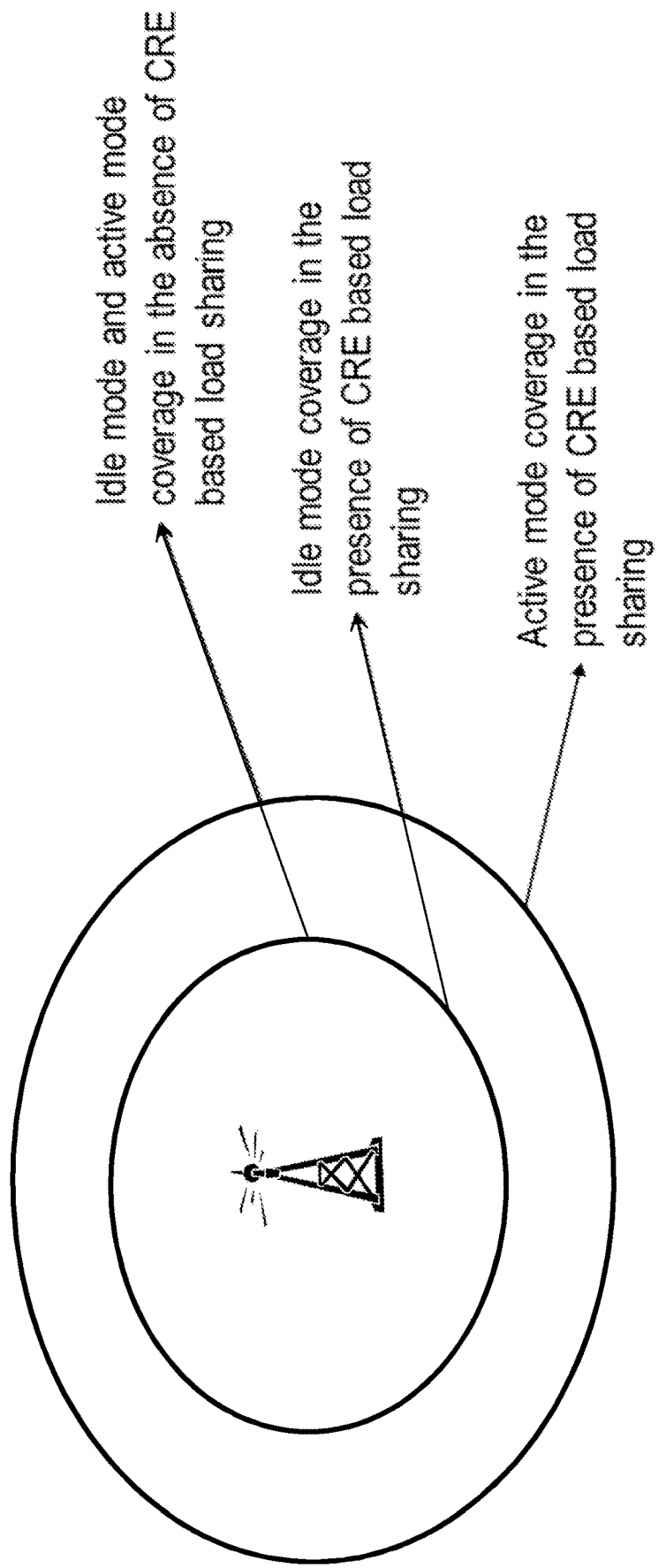
FIG. 1 shows a schematic overview depicting radio coverage of an active mode and an idle mode.
Figure 2:
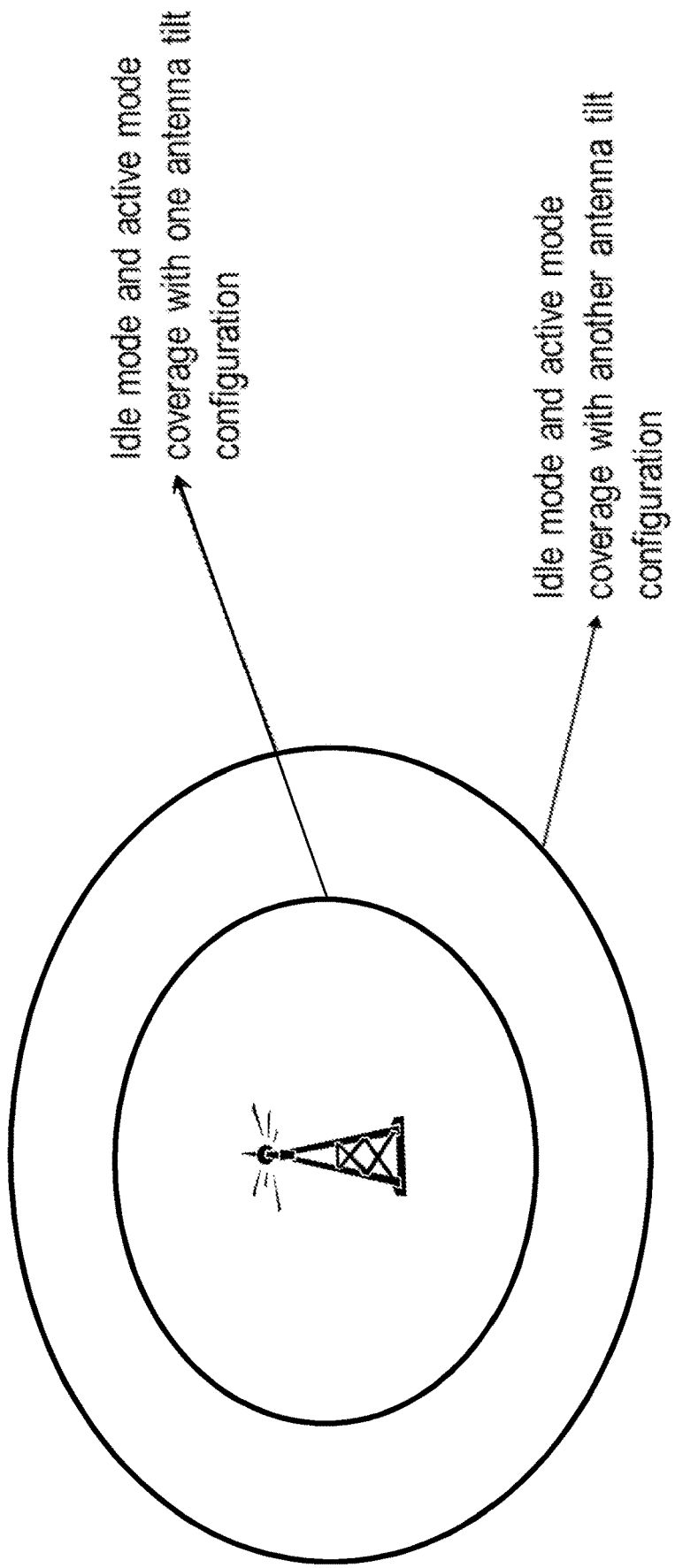
FIG. 2 shows a schematic overview depicting radio coverage of an active mode and an idle mode using different antenna tilt configurations.
Figure 3:
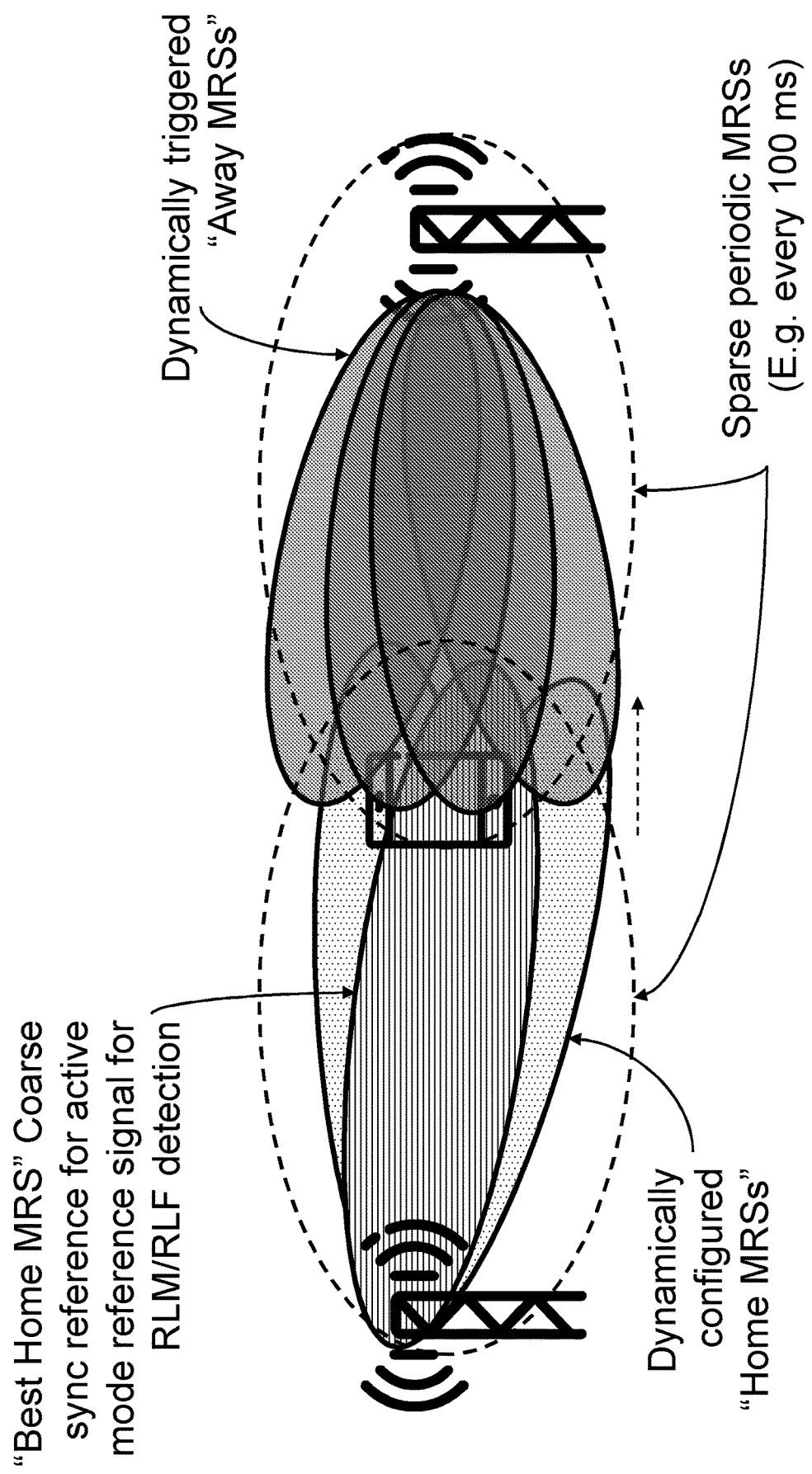
FIG. 3 shows a schematic overview depicting a multiple beam scenario.
Figure 4:
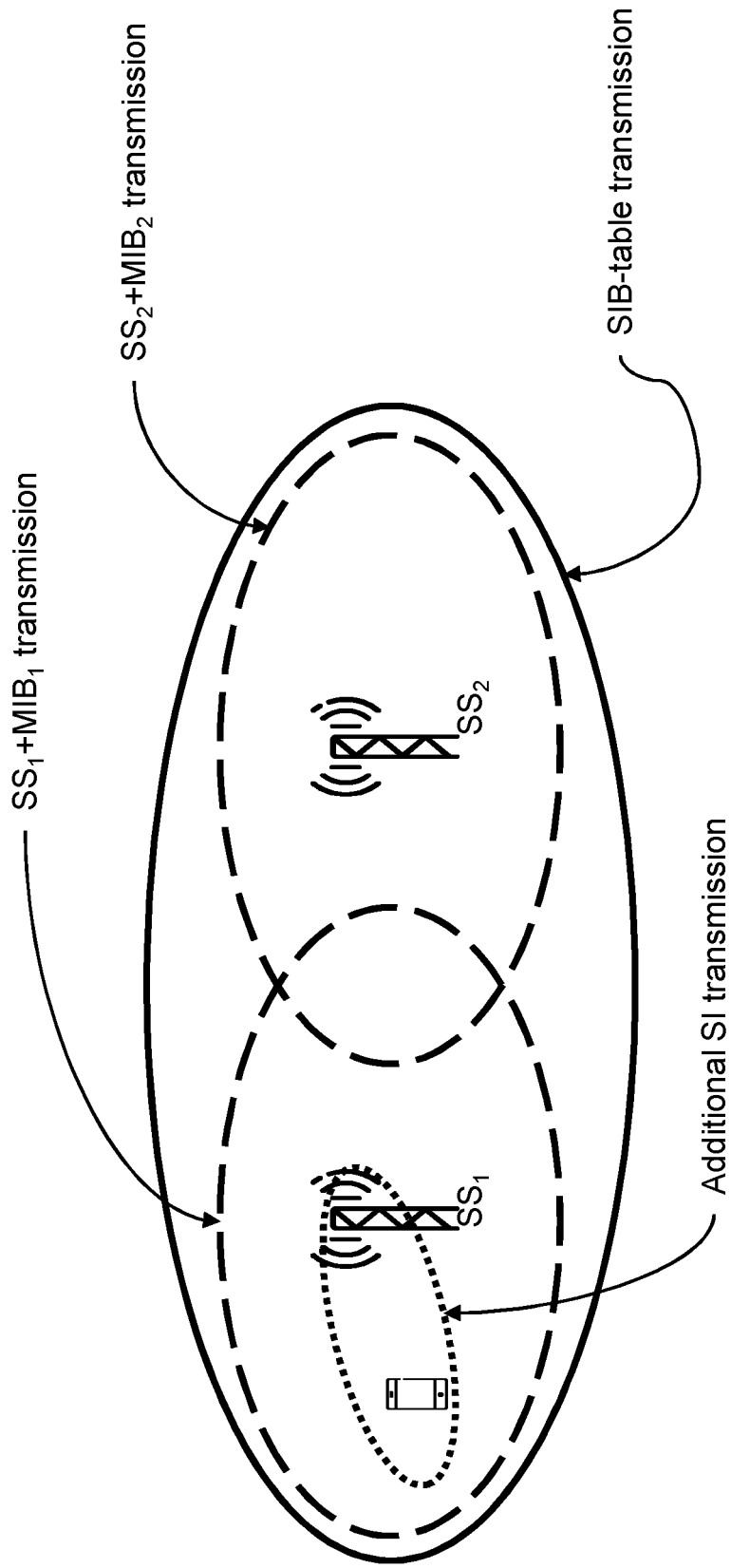
FIG. 4 shows a schematic overview depicting system information acquisition for NR.
Figure 5:
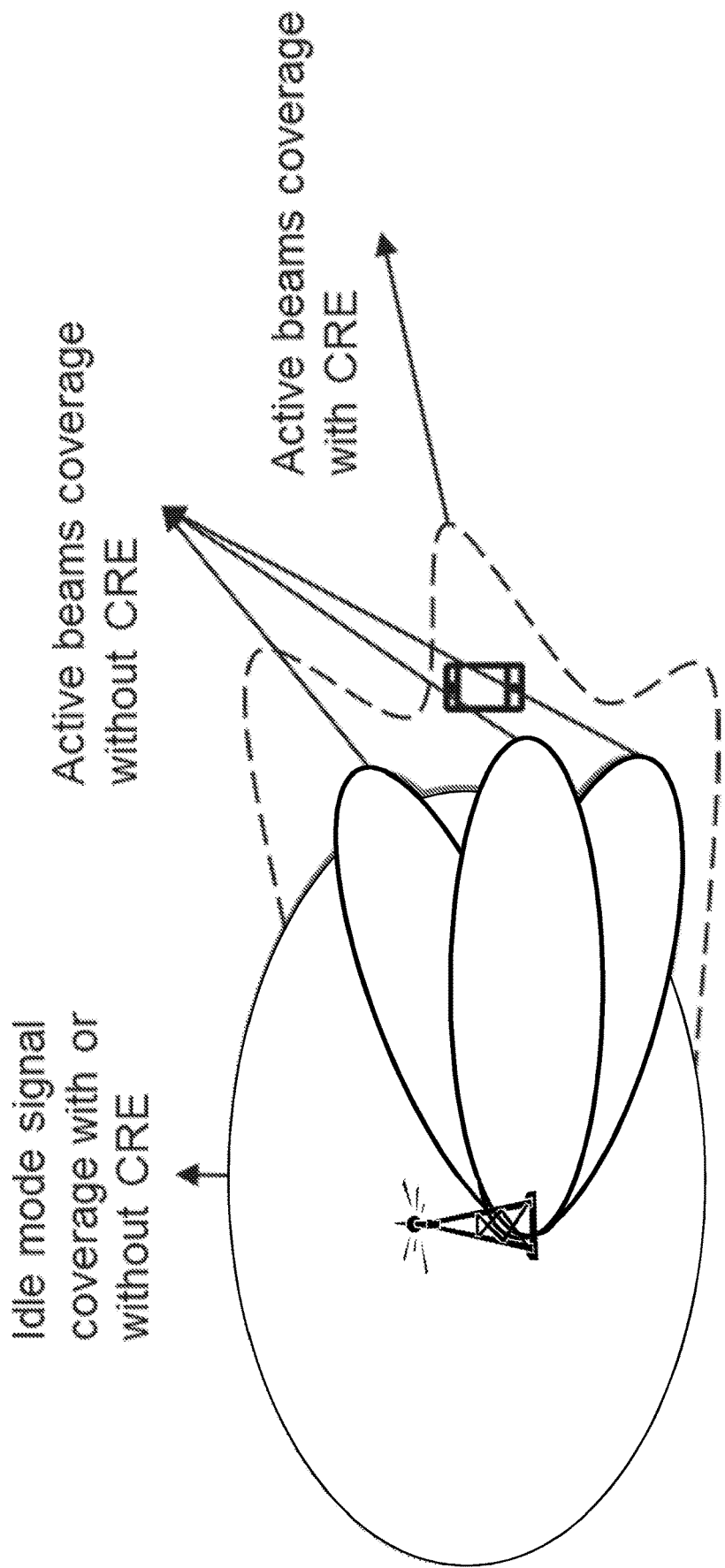
FIG. 5 shows a schematic overview depicting CRE based load sharing method in an active mode beam based system.
Figure 6:
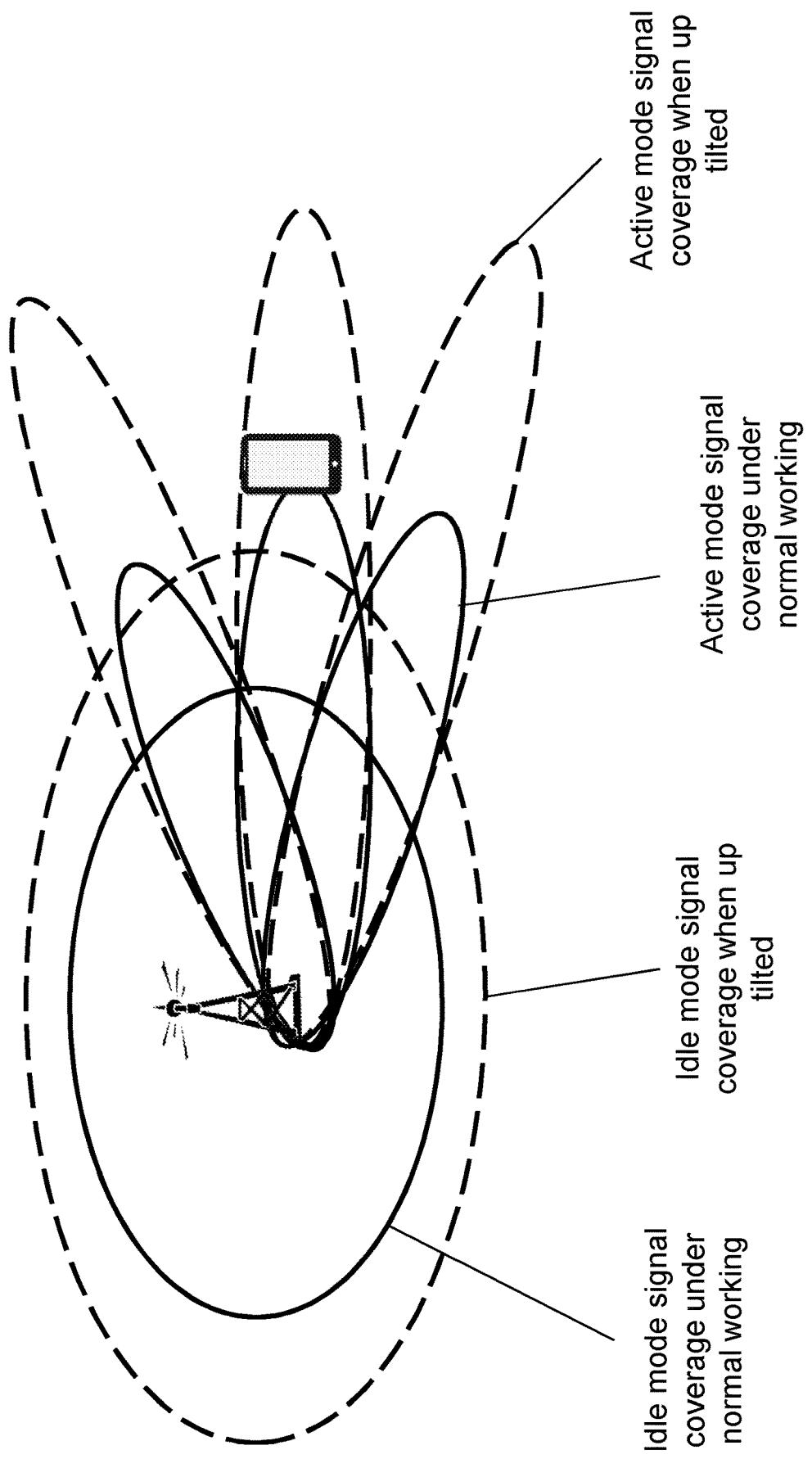
FIG. 6 shows a schematic overview depicting radio coverage of using changed parameters of an antenna or port e.g. for load sharing.
Figure 7:
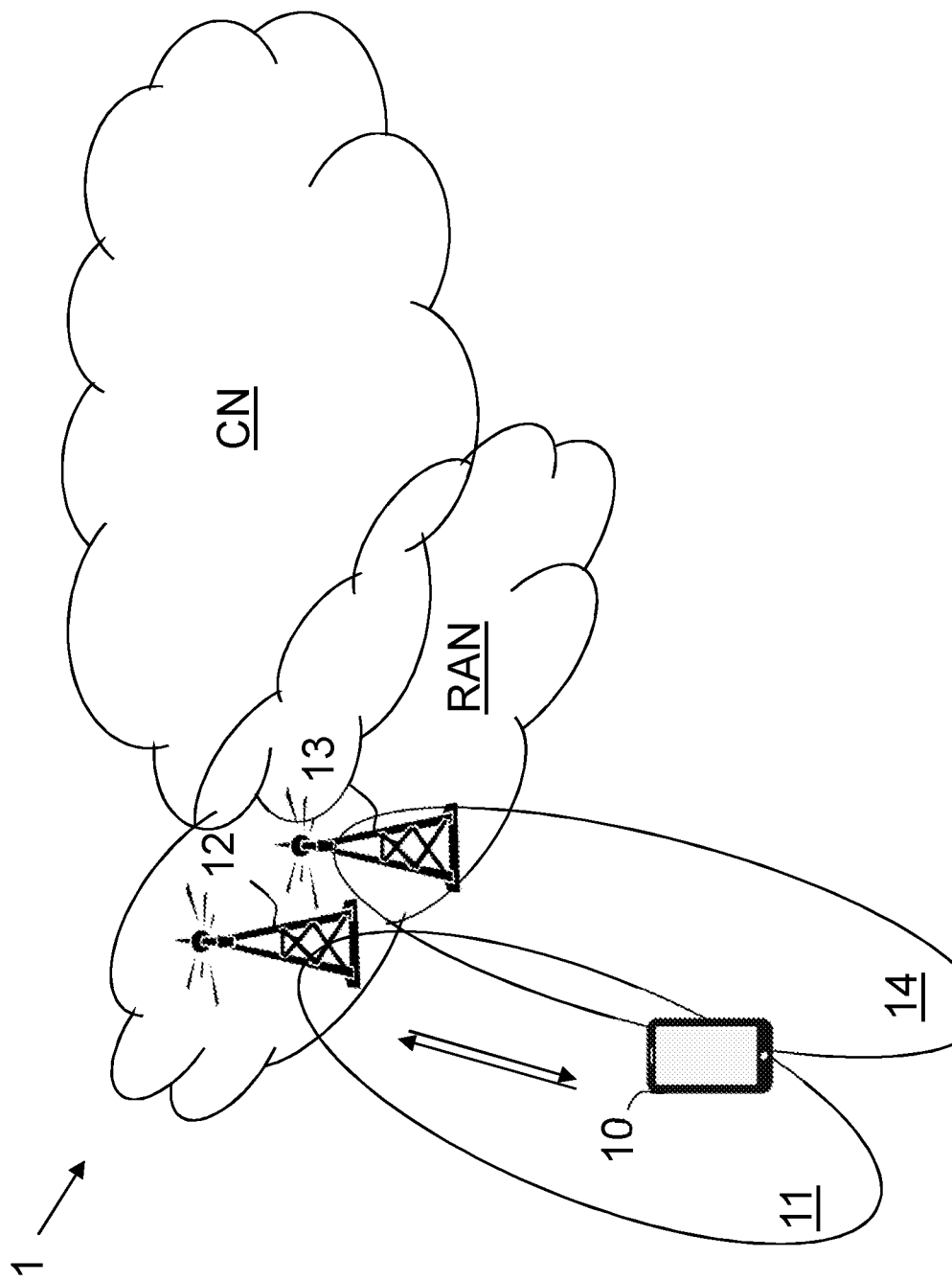
FIG. 7 shows a schematic overview depicting a wireless communication network according to embodiments herein.

Embodiments herein relate to wireless communication networks in general. FIG. 7 is a schematic overview depicting a wireless communication network 1. The wireless communication network 1 comprises one or more RANs and one or more CNs. The wireless communication network 1 may use one or a number of different technologies, such as Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context such as an NR context, however, embodiments are also applicable in further development of the existing wireless communication systems such as e.g. WCDMA and LTE.

In the wireless communication network 1, wireless devices e.g. a wireless device such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the radio network node.

The wireless communication network 1 comprises a first radio network node 12 providing radio coverage over a geographical area, a first service area 11 or a first beam, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the first radio network node 12 depending e.g. on the first radio access technology and terminology used. The first radio network node may also be exemplified as a centralized RAN (C-RAN) node responsible for multiple transmission points (TPs). The first radio network node 12 may be referred to the radio network node or as a serving network node wherein the first service area may be referred to as a serving area or source beam, and the serving network node communicates with the wireless device 10 in form of DL transmissions to the wireless device 10 and UL transmissions from the wireless device 10.

A second radio network node 13 may further provide radio coverage over a second service area 14 or a second beam of a second radio access technology (RAT), such as NR, LTE, WiMAX or similar. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second service area 14 may be referred to as a neighbouring beam or target beam.

It should be noted that a service area may be denoted as cell, beam, mobility measurement beam, beam group or similar to define an area of radio coverage. The radio network nodes transmit RSs over respective service area. Hence, the first and second radio network nodes may transmit e.g. MRSs or beam reference signals (BRS), repeatedly, in time, in a large number of different directions using as many Tx-beams as deemed necessary to cover an operational area of the radio network node. As the naming indicates, each MRS represents a unique Tx-beam from that radio network node. Hence the first radio network node 12 provides radio coverage over the first service area using a first reference signal, e.g. a first MRS, for identifying the first service area 11 in the wireless communication network. The second radio network node 13 provides radio coverage over the second service area 14 using a second reference signal, e.g. a second MRS, for identifying the second service area 14 in the wireless communication network. These reference signals, first and second MRS, may be initiated upon request from a radio network node, e.g. a neighboring radio network node, or configured to be sent continuously. An RS is associated with a port, or an antenna port, i.e. when the first wireless device 10 is measuring a particular RS, it can be equivalently said that the first wireless device 10 is measuring the port or beam of the port that corresponds to the particular RS. If the RS is beam-formed, i.e. transmitted with a multi-antenna precoding vector that generates a beam in a certain pointing direction, one can say that the first wireless device 10 is using a beam-formed RS or a port of the beam. Furthermore, each radio network node may provide radio coverage for idle mode transmissions which radio coverage may be different than the radio coverage for active mode transmissions.

Embodiments herein provide a method to expand or shrink the coverage of a radio network node such as the first radio network node 12 in the active mode without affecting the coverage of the first radio network node 12 in the idle mode. Basically, one or more antenna parameters for active mode transmissions are decoupled from one or more antenna parameters for idle mode transmissions.

Figure 8:
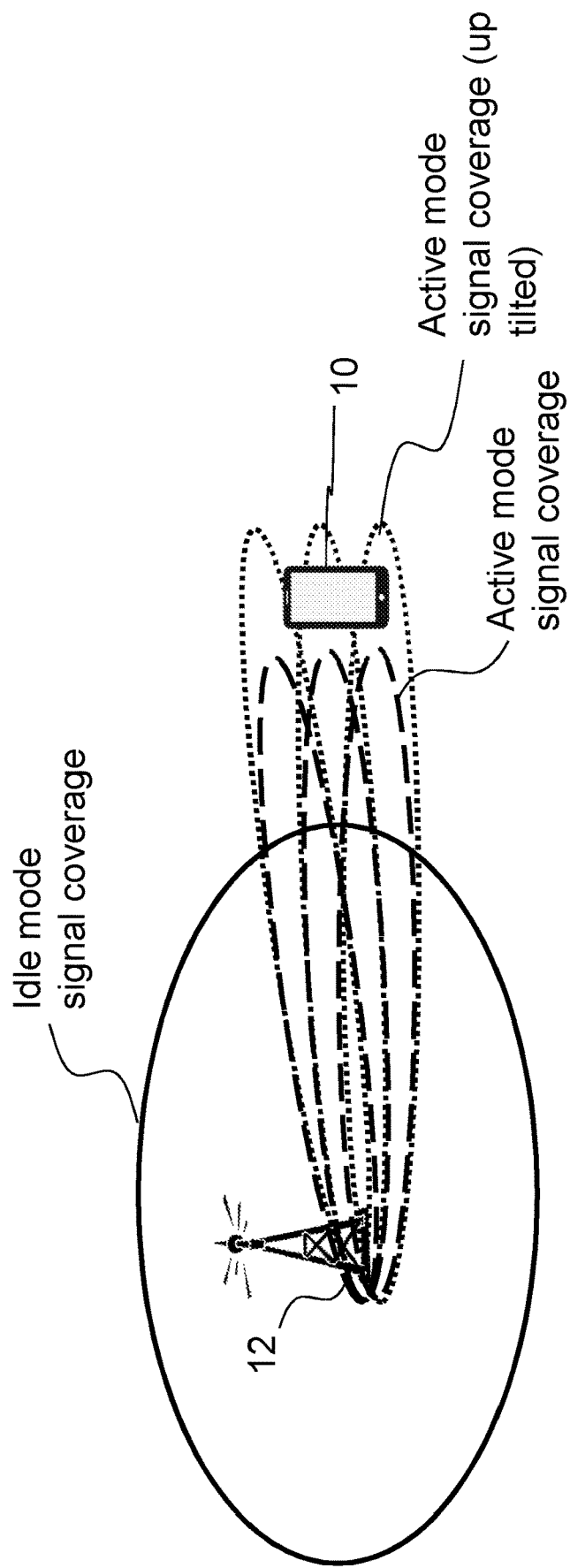
FIG. 8 shows a schematic overview depicting radio coverage of using changed parameters of an antenna or port according to embodiments herein.

The result of using the changed one or more antenna parameters as proposed herein is shown in FIG. 8. The first radio network node 12 changes one or more antenna parameters corresponding to one or more antenna ports used for an active mode transmission, i.e. a transmission to a connected wireless device, for the wireless device 10, independently of one or more other antenna parameters corresponding to one or more other antenna ports used for an idle mode transmission within the first service area. The antenna parameters may be referred to as transmission parameters, parameters, antenna mode parameters e.g. active mode parameters and idle mode parameters, or antenna port parameters, and may comprise one or more of: pre-coding weights; antenna tilt; beam-width in azimuth and in elevation; and beam direction. The antenna ports, also referred to as ports, for active mode transmissions and idle mode transmissions may be logically separated in the first radio network node 12. In contrast, prior art uses the same antenna ports for provisioning of system information and reference signals that the wireless device monitors in a Radio Resource Control (RRC) connected/active mode. Embodiment herein disclose that different antenna ports are used for these functions or mode transmissions. This will enable the first radio network node 12 to only change the antenna parameter(s) for antenna ports used for active mode functions without affecting antenna ports for the idle mode transmissions.

The first radio network node 12 then uses the one or more antenna port for active mode transmissions for the wireless device and the one or more other antenna ports for idle mode transmissions within the first service area.

This will result in a dynamic increase, or decrease, in the active mode coverage area of the first radio network node 12. The original coverages or beams are dashed and the expanded or adjusted beams are dotted. The increase in the coverage area of the first radio network node 12 will not result in an increased risk of RLF since the active mode beam signals on which the wireless device 10 is maintaining its RLM process is also up-tilted and hence the improvement in reception quality of the signals in the region which has been added to the original active mode coverage of the first radio network node 12.

Figure 9:
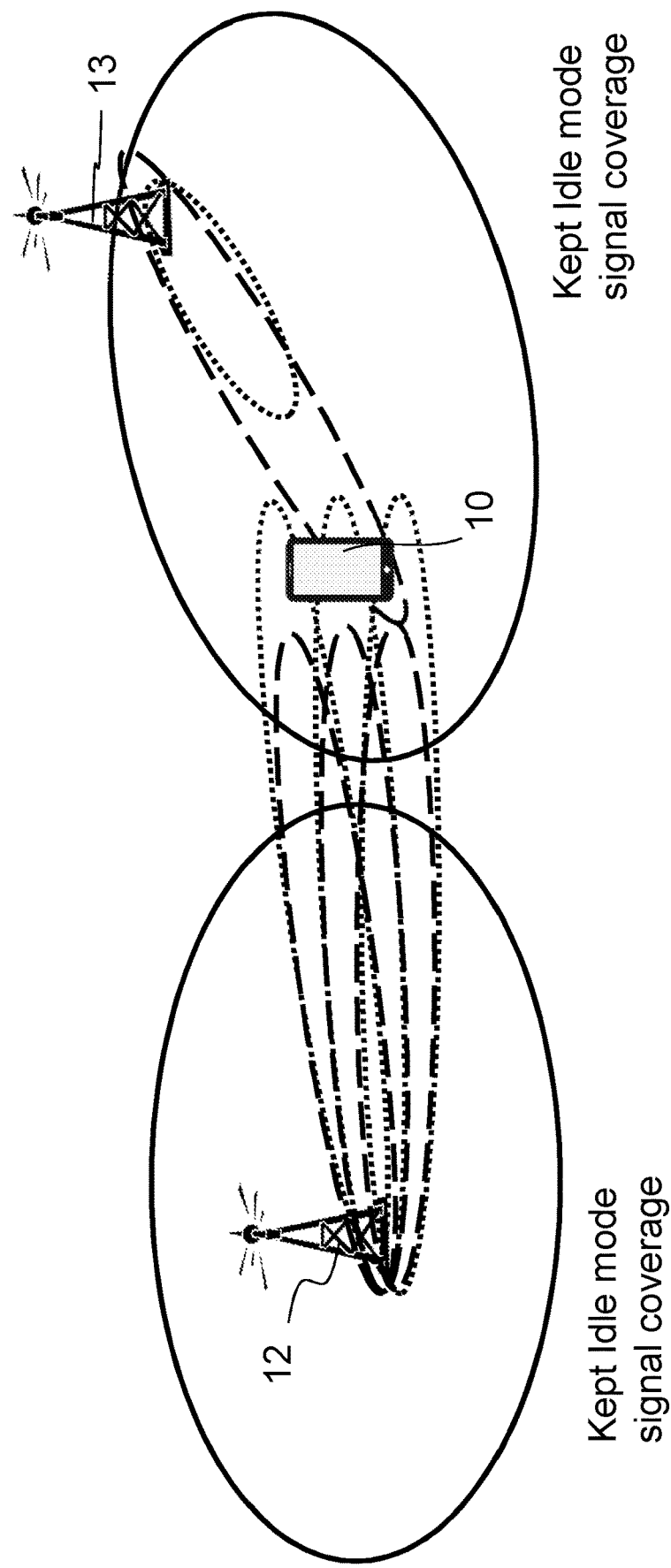
FIG. 9 shows a schematic overview depicting changing radio coverage according to embodiments herein for load sharing.

The impact of using embodiments herein, also called a coordinated antenna tilt based active mode load sharing process, is also shown in FIG. 9.

In case the traffic load of one radio network node, e.g. the second radio network node 13, is much higher than the traffic load in a neighbouring radio network node, e.g. the first radio network node 12, then embodiments herein change antenna parameters e.g. an antenna tilt of active mode antenna ports of both radio base stations in order to even out the traffic load between the radio network nodes. For example, the active mode antenna ports of the second radio network node 13 may be directed downwards (effectively making the traffic pick-up area smaller see dotted oval) in the highly loaded radio network node and, correspondingly change the antenna tilt of the active mode antenna ports upwards (effectively making the traffic pick-up area larger see dotted ovals) in the lowly loaded radio network node. This is not possible in prior art since that will impact the coverage area of the idle mode transmissions in the wireless communication network.

As shown in the FIG. 9, the idle mode radio coverage is intact and e.g. a Self Organizing Network (SON) feature controlling the active mode antenna parameters has up-tilted the first radio network node 12 active mode antenna parameters whereas it has down-tilted active mode antenna parameters of the second radio network node 13 simultaneously. This will result in a dynamic increase in the active mode coverage area of the first radio network node 12 and a dynamic decrease in the active mode coverage area of the second radio network node 13. The increase in the coverage area of the first radio network node 12 has not resulted in an increased risk of RLF, unlike CRE based methods, as the active mode beam signals on which the wireless device 10 is maintaining its RLM process is also up-tilted and hence the improvement in reception quality of the signals in the region which has been added to the original active mode coverage of the first radio network node 12.

It should be noted that the illustrated example exemplifies a scenario where the first radio network node 12 expands the radio coverage for active mode wireless devices taking over the wireless device 10 from the second radio network node 13 but embodiments herein also cover the scenario wherein the first radio network node decreases the radio coverage and the second radio network node 13 expands its active mode coverage.

Note that in a general scenario the term "radio network node" can be substituted with "transmission point". The key observation is that it must be possible to make a distinction between the transmission points (TPs), typically based on MRSs or different synchronization signals and BRSs transmitted. Several TPs may be logically connected to the same radio network node but if they are geographically separated, or pointing in different propagation directions, they will be subject to the same mobility issues as different radio network nodes. In subsequent sections, the terms "radio network node" and "TP" are interchangeable.

Figure 10:
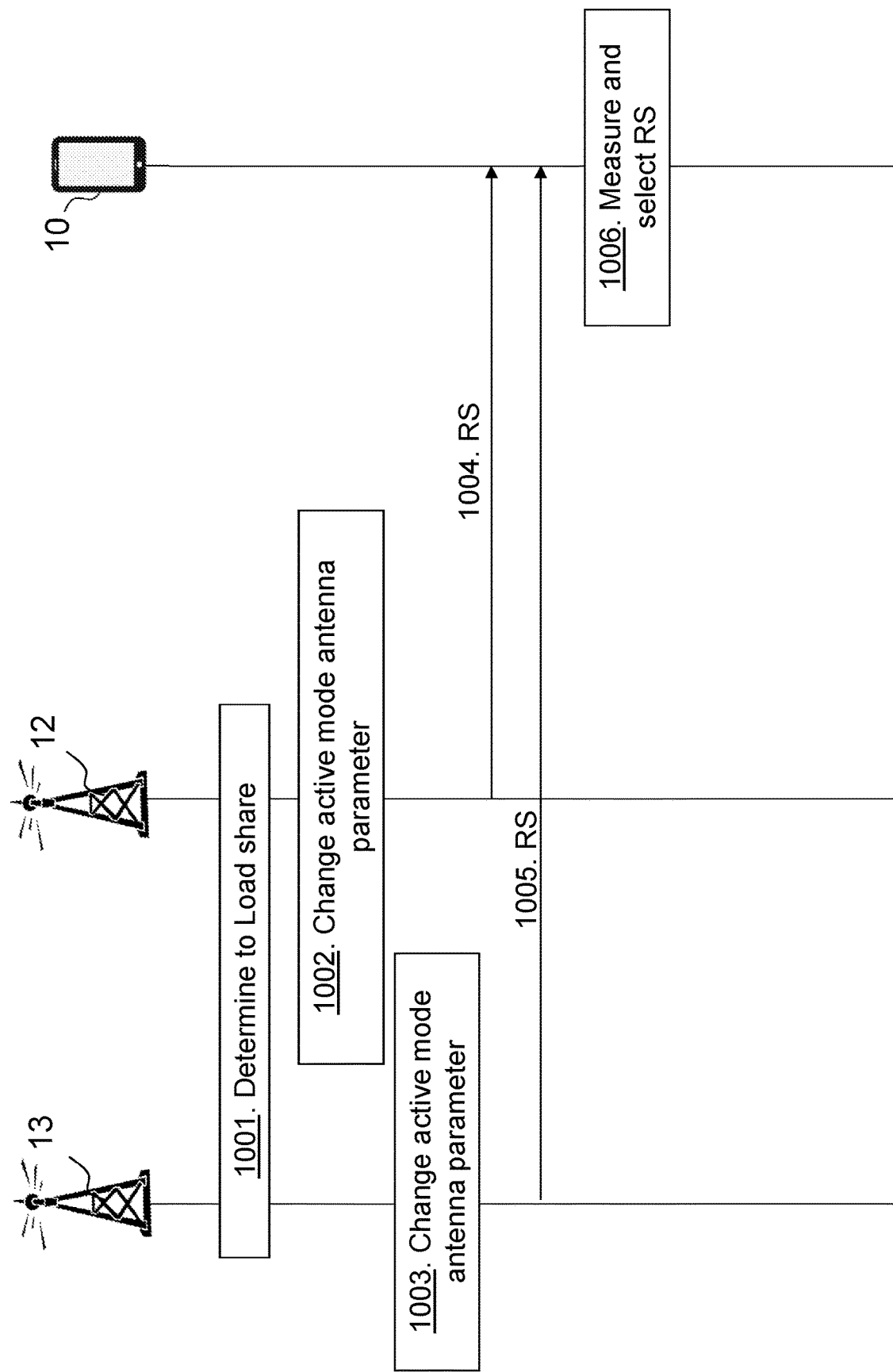
FIG. 10 is a schematic combined flowchart and signaling scheme according to embodiments herein.

FIG. 10 is a combined flowchart and signaling scheme according to embodiments herein.

Action 1001. The first radio network node 12 may determine to load share wireless devices with the second radio network node 13. E.g. the first radio network node 12 may determine a first load of a first beam controlled by the first radio network node 12, and/or the second radio network node 13 may determine a second load of a second beam controlled by the second radio network node 13. The first radio network node 12 may then, based on one or more of the determined loads, to e.g. exchange load between the radio network nodes. The first radio network node 12 may inform the second radio network node 13 and/or the first and second radio network nodes may perform a negotiation and agree upon the load sharing. It should be noted that this decision to load share between the first and second radio network nodes may be performed at a different network node, such as an operation and maintenance node, and the first and second radio network nodes are merely informed or commanded to initiate load sharing. This is an example of the first radio network node determining to initiate the active mode for the wireless device 10 e.g. due to load share the wireless device to the first radio network node from the second radio network node.

Action 1002. The first radio network node 12 then changes or adjusts the one or more antenna parameters, also referred to as active mode antenna parameters, corresponding to the one or more antenna ports used for the active mode transmissions for the wireless device 10, independently of the one or more other antenna parameters, also referred to as idle parameters, corresponding to the one or more other antenna ports used for idle mode transmissions within the first service area 11.

Action 1003. The second radio network node 13 then changes or adjusts one or more antenna parameters corresponding to one or more antenna ports, at the second radio network node 13, used for the active mode transmissions for the wireless device 10, independently of one or more other antenna parameters corresponding to one or more other antenna ports, at the second radio network node 13, used for idle mode transmissions within the second service area 14.

Thus, the first radio network node 12 may expand the radio coverage and the second radio network node 13 may reduce its radio coverage. It should be noted that it may be vice versa.

Action 1004. The first radio network node 12 then uses the one or more ports e.g. by transmitting first beam-formed RSs. E.g. the first radio network node 12 may apply the one or more antenna parameters for the port/s for active mode. The beam may thus be expanded in radio coverage due to the one or more changed antenna parameters.

Action 1005. The second radio network node 13 then uses the one or more ports e.g. by transmitting second beam-formed RS. The beam may thus be reduced in radio coverage due to the one or more changed antenna parameters.

Action 1006. The wireless device 10 may then receive first and/or the second RSs and select a beam based on e.g. signal strength or quality, and/or to generate and to transmit a measurement report back to the first radio network node 12. E.g. the wireless device 10 may measure respective signal strength or quality of respective RS and select a beam based on that. Hence, the wireless device 10 may select the RS of the first radio network node 12 and thus the first radio network node serves the wireless device being in active mode reducing the load of active mode wireless devices of the second radio network node 13.

Figure 11:
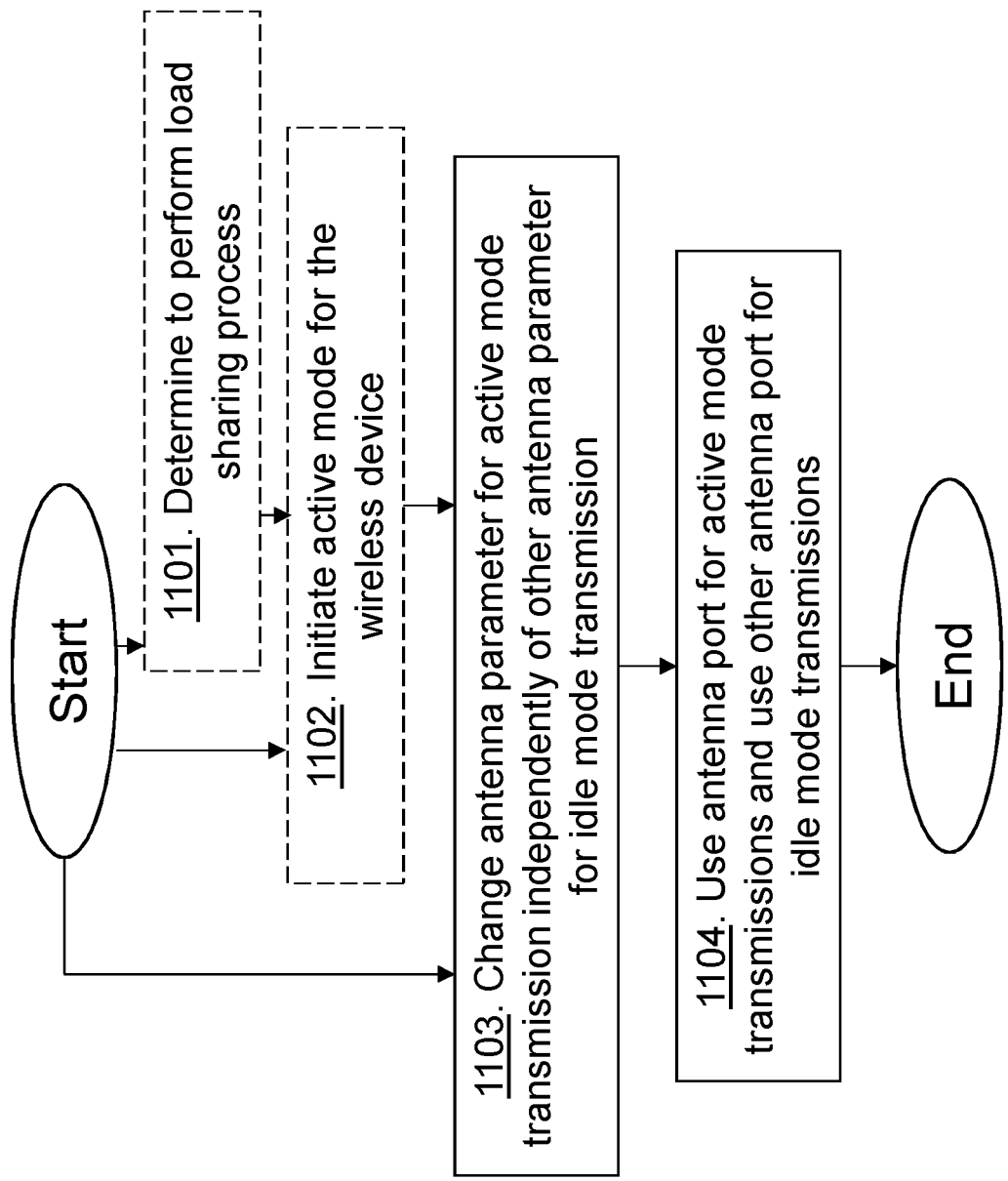
FIG. 11 is a schematic flowchart depicting a method performed by a first radio network node according to embodiments herein.

The method actions performed by the first radio base station 12 for handling communication of the wireless device 10 in the wireless communication network 1 according to some embodiments will now be described with reference to a flowchart depicted in FIG. 11. The actions do not have to be taken in the order stated below, but may be taken in any suitable order. Actions performed in some embodiments are marked with dashed boxes.

Action 1101. The first radio network node 12 may determine to perform the load sharing process with the second radio network node 13. This may be based on a load associated with the first radio network node 12 and/or a load associated with the second radio network node 13. Thus, the first radio network node 12 may determine to initiate the load sharing process of the wireless device 10. The first radio network node 12 may e.g. receive a request from the second radio network node 13 or another network node indicating to reduce or amplify/prolong radio coverage of the first service area or beam. Based on the received request the first radio network node 12 may determine to initiate the load sharing process with the second radio network node 13.

Action 1102. The first radio network node 12 may initiate the active mode for the wireless device 10, i.e. the first radio network node may initiate the load sharing of active mode wireless devices. E.g. the first radio network node 12 may determine to initiate the active mode for the wireless device 10, e.g. to perform the load sharing process with the second radio network node 13. The first radio network node may be triggered to initiate the active mode for the wireless device by determining to perform the load sharing process with the second radio network node 13, see action 1101.

Action 1103. The first radio network node 12 changes the one or more antenna parameters corresponding to the one or more antenna ports used for an active mode transmission for the wireless device, independently of the one or more other antenna parameters corresponding to the one or more other antenna ports used for an idle mode transmission within the first service area 11. The changing of the one or more antenna parameters may increase or decrease, in length, the radio coverage of the first radio network node 12.

Action 1104. The first radio network node 12 uses the one or more antenna ports for active mode transmissions for the wireless device 10 and/or the one or more other antenna ports for idle mode transmissions within the first service area. E.g. the first radio network node 12 may use the one or more antenna ports with the changed one or more antenna parameters for wireless devices in active mode and may use the one or more other antenna ports with the one or more other antenna parameters for idle mode transmissions.

The one or more antenna ports for the active mode and the one or more other antenna ports for the idle mode may be logically separated in the first radio network node 12. The one or more antenna ports may be used for transmitting radio resource control messages for wireless devices, such as the wireless device 10, in active mode and the one or more other antenna ports are used for transmitting system information and reference signals for wireless devices in idle mode.

Figure 12:
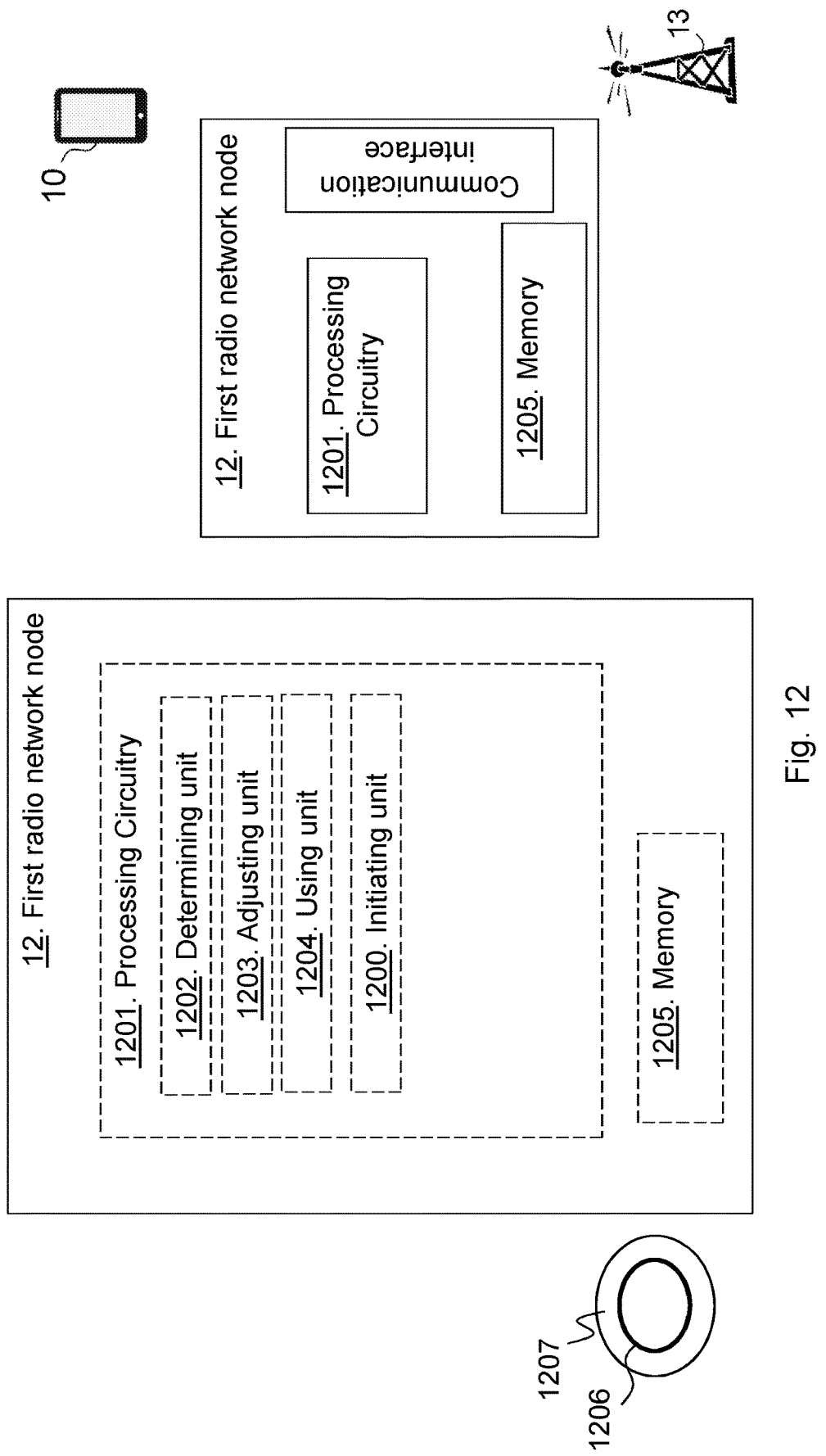
FIG. 12 is a block diagram depicting a first radio network node according to embodiments herein.

FIG. 12 is a block diagram depicting the first radio network node 12 for handling communication of the wireless device 10 in the wireless communication network 1, e.g. for enabling load sharing of wireless devices between radio network nodes, according to embodiments herein. The first radio network node 12 is configured to provide radio coverage over the first service area 11 using the first reference signal for identifying the first service area 11 in the wireless communication network 1.

The first radio network node 12 may comprise a processing circuitry 1201, e.g. one or more processors, configured to perform the methods herein.

The first radio network node 12 may comprise an initiating unit 1200. The first radio network node 12, the processing circuitry 1201, and/or the initiating unit 1200 may be configured to initiate the active mode for the wireless device.

The first radio network node 12 may comprise a determining unit 1202. The first radio network node 12, the processing circuitry 1201, and/or the determining unit 1202 may be configured to trigger the initiation to the active mode by being configured to determine to perform a load sharing process with a second radio network node 13. The first radio network node 12, the processing circuitry 1201, and/or the determining unit 1202 may be configured to determine to initiate the load sharing process of the wireless device 10 and/or determine to initiate the active mode for the wireless device 10. The first radio network node 12, the processing circuitry 1201, and/or the determining unit 1202 may be configured to determine to perform the load sharing process with the second radio network node 13 based on the load associated with the first radio network node and/or second radio network node.

The first radio network node 12 may comprise an adjusting unit 1203. The first radio network node 12, the processing circuitry 1201, and/or the adjusting unit 1203 is configured to change the one or more antenna parameters, corresponding to the one or more antenna ports used for the active mode transmission for the wireless device, independently of the one or more other antenna parameters corresponding to the one or more other antenna ports used for the idle mode transmission within the first service area. E.g. the first radio network node 12, the processing circuitry 1201, and/or the adjusting unit 1203 may be configured to change or adjust the one or more parameters corresponding to the one or more antenna ports used for the active mode transmissions of the wireless device, independently of the one or more other parameters corresponding to the one or more other antenna ports used for an idle mode transmission within the first service area. The first radio network node 12, the processing circuitry 1201, and/or the adjusting unit 1203 may be configured to change the one or more antenna parameters for the wireless device for increasing or decreasing the radio coverage in length of the first radio network node 12.

The first radio network node 12 may comprise a using unit 1204. The first radio network node 12, the processing circuitry 1201, and/or the using unit 1204 is configured to use the one or more antenna ports for active mode transmissions for the wireless device 10 and/or the one or more other antenna ports for idle mode transmissions within the first service area, e.g. to use the one or more antenna ports for the wireless device in active mode and further the other one or more ports for the idle mode transmission within the first service area. Furthermore, the one or more antenna ports for the active mode and the one or more other antenna ports for the idle mode may be logically separated in the first radio network node 12. The first radio network node 12, the processing circuitry 1201, and/or the using unit 1204 may be configured to use the one or more antenna ports for transmitting radio resource control messages for the wireless device 10 in active mode, also known as connected state, and the one or more other antenna ports are used for transmitting system information and reference signals for wireless devices in idle mode. The units mentioned herein may also be referred to as modules.

The first radio network node 12 further comprises a memory 1205. The memory comprises one or more units to be used to store data on, such as MRSs, strengths or qualities, parameters, thresholds, capabilities, antenna characteristics, applications to perform the methods disclosed herein when being executed, and similar. The first radio network node 12 may further comprise a communication interface e.g. one or more antennas and/or transceivers.

The methods according to the embodiments described herein for the first radio network node 12 are respectively implemented by means of e.g. a computer program 1206 or a computer program product, comprising instructions, i.e., software code portions, which, when executed on at least one processor, cause the at least one processor to carry out the actions described herein, as performed by the first radio network node 12. The computer program 1206 may be stored on a computer-readable storage medium 1207, e.g. a disc or similar. The computer-readable storage medium 1207, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

It is herein disclosed a method performed by a first radio network node for handling communication of a wireless device in a wireless communication network. The first radio network node provides radio coverage over a first service area using a first reference signal, also referred to as a first beam, for identifying the first service area in the wireless communication network. The first radio network node may determine to initiate an active mode for the wireless device. The first radio network node further changes one or more antenna parameters corresponding to one or more antenna ports used for the active mode of the wireless device, independently of one or more other antenna parameters corresponding to one or more other antenna ports used for an idle mode transmission within the first service area. The first radio network node then uses the one or more antenna port for active mode transmissions for the wireless device and/or the one or more other antenna ports for idle mode transmissions within the first service area.

It is further herein disclosed a first radio network node for handling communication of a wireless device in a wireless communication network. The first radio network node is configured to provide radio coverage over a first service area using a first reference signal, also referred to as a first beam, for identifying the first service area in the wireless communication network. The first radio network node may further be configured to determine to initiate an active mode for the wireless device. The first radio network node is configured to change or adjust one or more antenna parameters corresponding to one or more antenna ports used for the active mode of the wireless device, independently of one or more other antenna parameters corresponding to one or more other antenna ports used for an idle mode transmission within the first service area. The first radio network node is further configured to use the one or more antenna port for active mode transmissions for the wireless device and/or the one or more other antenna ports for idle mode transmissions within the first service area.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) node etc.

In some embodiments the non-limiting term wireless device or user equipment (UE) is used and it refers to any type of wireless device communicating with a radio network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in Mobility measurement beams. Thus, while the term "MRS" is used herein to refer a signal used herein, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

Antenna node: As used herein, an "antenna node" is a unit capable of producing one or more beams covering a specific service area or direction. An antenna node can be a base station, or a part of a base station.

As will be readily understood by those familiar with communications design, that functions units or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

3GPP Third Generation Partnership Project
CRE Cell Range Expansion
CIO Cell Individual Offset
eNB Enhanced NodeB
LTE Long Term Evolution
UE User Equipment
ANR Automatic neighbor relations
MRS Mobility reference signal or measurement reference signal
BRS Beam reference signal
AMM active mode mobility
SON Self optimizing network
ID identity
NR New Radio

The invention claimed is:

1. A method performed by a first radio network node for handling communication of a wireless device in a wireless communication network, wherein the first radio network node provides radio coverage over a first service area using a first reference signal, which first reference signal is for identifying the first service area in the wireless communication network, the method comprising:

changing one or more antenna parameters, corresponding to one or more antenna ports used for an active mode transmission for the wireless device, independently of one or more other antenna parameters corresponding to one or more other antenna ports used for an idle mode transmission within the first service area; and using the one or more antenna ports for active mode transmissions for the wireless device and/or the one or more other antenna ports for idle mode transmissions within the first service area without changing coverage for the idle mode transmissions of the first radio network node.

2. The method according to claim 1, further comprising: initiating the active mode for the wireless device.

3. The method according to claim 1, wherein initiating the active mode for the wireless device is triggered by determining to perform a load sharing process with a second radio network node.

4. The method according to claim 3, wherein determining is based on a load associated with the first radio network node and/or the second radio network node.

5. The method according to claim 1, wherein the changing the one or more antenna parameters is increasing or decreasing a radio coverage in length of the first radio network node.

6. The method according to claim 1, wherein the one or more antenna ports for the active mode and the one or more other antenna ports for the idle mode are logically separated in the first radio network node.

7. The method according to claim 1, wherein the one or more antenna ports are used for transmitting radio resource control messages for the wireless device in active mode and the one or more other antenna ports are used for transmitting system information and reference signals for wireless devices in idle mode.

8. A first radio network node for handling communication of a wireless device in a wireless communication network, wherein the first radio network node is configured to provide radio coverage over a first service area using a first reference signal, which first reference signal is for identifying the first service area in the wireless communication network, wherein the first radio network node comprises processing circuitry and a memory, said memory comprising instructions executable by said processing circuitry whereby said first radio network node is operative to:

change one or more antenna parameters, corresponding to one or more antenna ports used for an active mode transmission for the wireless device, independently of one or more other antenna parameters corresponding to one or more other antenna ports used for an idle mode transmission within the first service area; and use the one or more antenna ports for active mode transmissions for the wireless device and/or the one or more other antenna ports for idle mode transmissions within the first service area without changing coverage for the idle mode transmissions of the first radio network node.

9. The first radio network node according to claim 8, wherein the first radio network node is further operative to initiate the active mode for the wireless device.

10. The first radio network node according to claim 9, wherein the first radio network node is operative to trigger the initiation of the active mode by being operative to determine to perform a load sharing process with a second radio network node.

11. The first radio network node according to claim 10, wherein the first radio network node is operative to determine to perform the load sharing process with the second radio network node based on a load associated with the first radio network node and/or second radio network node.

12. The first radio network node according to claim 8, wherein the first radio network node is operative to change the one or more antenna parameters for the wireless device for increasing or decreasing a radio coverage in length of the first radio network node.

13. The first radio network node according to claim 8, wherein the one or more antenna ports for the active mode and the one or more other antenna ports for the idle mode are logically separated in the first radio network node.

14. The first radio network node according to claim 8, wherein the first radio network node is operative to use the one or more antenna ports for transmitting radio resource control messages for the wireless device in active mode, and to use the one or more other antenna ports for transmitting system information and reference signals for wireless devices in idle mode.

* * * * *